E. I. OLINGER.
PLANTER.
APPLICATION FILED OCT. 1, 1917.
1,262,084.
Patented Apr. 9, 1918.
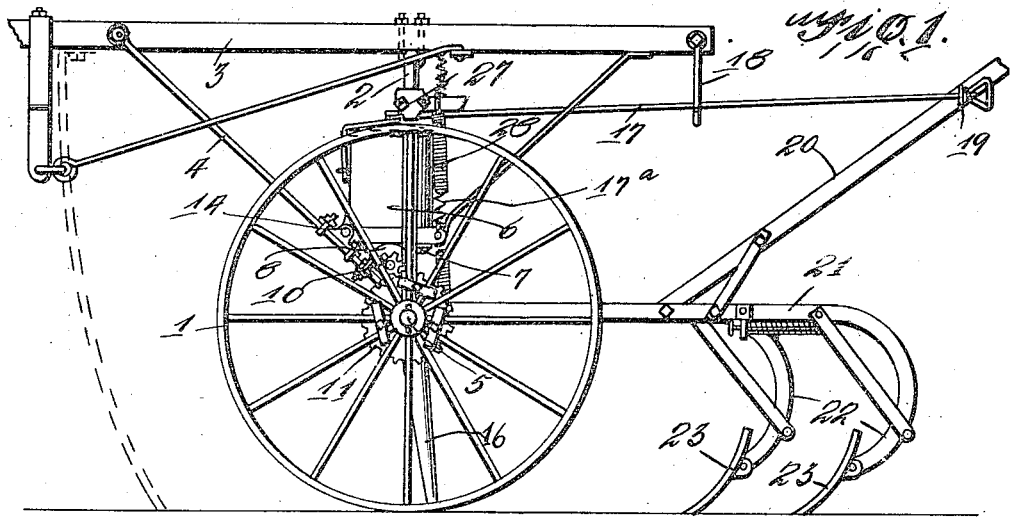
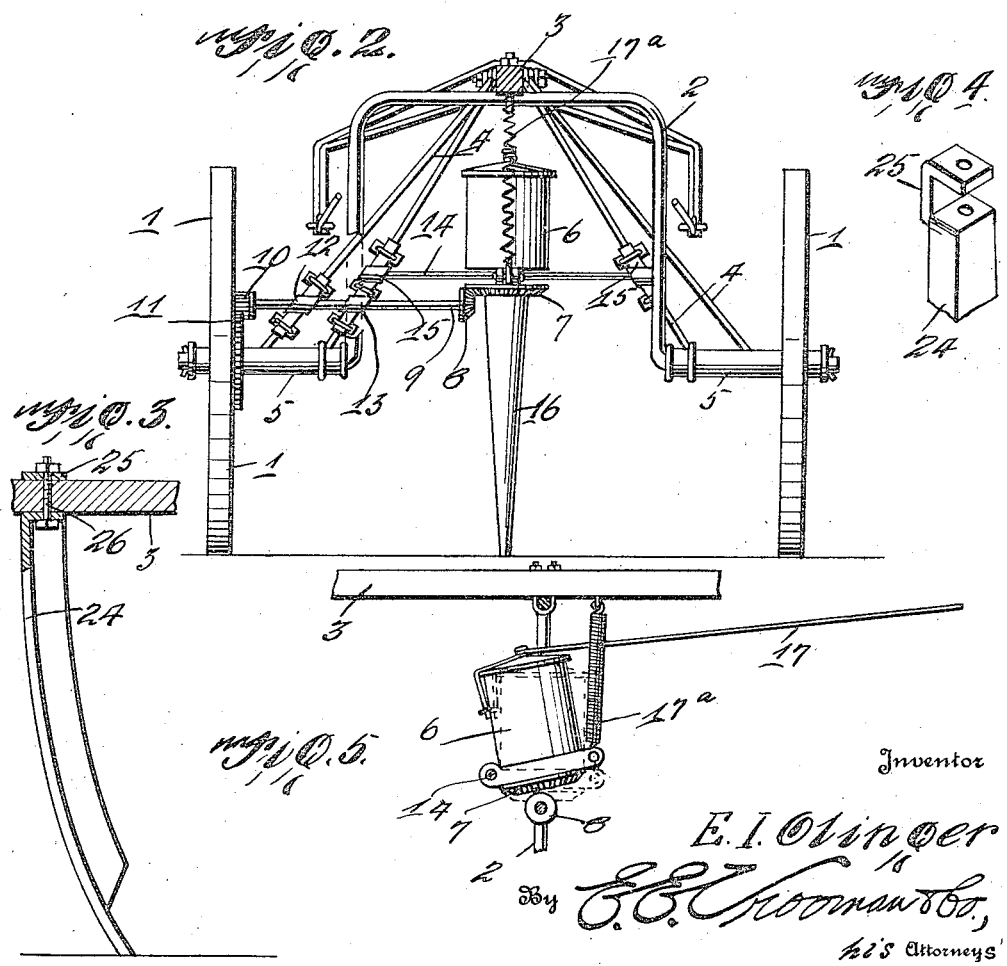
Inventor
E. I. Olinger
his Attorneys

UNITED STATES PATENT OFFICE.

ELEMUEL I. OLINGER, OF POLLOCK, MISSOURI.

PLANTER.

1,262,084.  Specification of Letters Patent.  Patented Apr. 9, 1918.

Application filed October 1, 1917. Serial No. 194,238.

*To all whom it may concern:*

Be it known that I, ELEMUEL I. OLINGER, citizen of the United States of America, residing at Pollock, in the county of Sullivan and State of Missouri, have invented certain new and useful Improvements in Planters, of which the following is a specification, reference being had therein to the accompanying drawing.

This invention relates to planters and has for its object the production of a simple and efficient planter which will efficiently drop the grain and which may be so operated as to discontinue the dropping of the grain at the will of the operator.

With this and other objects in view this invention consists of certain novel constructions, combinations and arrangements of parts as will be hereinafter fully described and claimed.

In the drawings:

Figure 1 is a side elevation of the planter.

Fig. 2 is a side rear elevation thereof, certain parts being broken away.

Fig. 3 is a longitudinal section through a portion of the draft beam showing the furrow forming knife connected thereto.

Fig. 4 is a detail perspective of the upper end of the furrow forming knife.

Fig. 5 is a side elevation of the seed box showing the spring for keeping the seed box normally out of contact with the driving gear.

By referring to the drawings it will be seen that 1 designates the supporting wheels of the planter which carries the usual frame 2. A suitable draft beam 3 is supported upon the frame 2 and this draft 3 is braced by means of a plurality of forwardly extending upwardly inclined braces 4. These braces 4 in turn are secured to the axles 5 of the frame. A suitable seed box 6 is suspended under the frame and carries a gear 7 at its lower end which gear 7 meshes with the pinion 8 carried by the drive shaft 9. This drive shaft 9 carries a pinion 10 which meshes with a gear 11 carried by one of the wheels 1 as shown clearly in Fig. 2 of the drawing. Suitable bearing blocks 12 and 13 are carried by the brace 4 to constitute efficient bearings for the shaft 9. And supporting shaft 14 is carried by the bearing blocks 15 mounted upon the brace 4 and this shaft 14 supports a seed block 6 above described. The gear 7 is of course driven by the gear 8 and is adapted to control the escapement of seeds from the container or seed box 6 so as to permit the seed to drop through the seed discharge spout 16 depending therefrom. A suitable operating lever 17 is secured to the top of the box 6 and passes through the guide 18 for permitting the seed box to be pulled down into an operative position or in other words drawn down so as to cause the gear 7 to mesh with the gear or pinion 8. This rod 17 also passes through the guide eye 19 carried by the handles 20. These handles 20 are supported upon the cultivator blade supporting bars 21 and these bars are provided with downwardly turned ends 22 which support the cultivator blades 23. These cultivator blade bars 21 are secured in the usual manner to the axles 5. A spring $17^a$ is connected to the lower front end tongue of the seed box 6 and to the under face of the tongue 3 for normally drawing the seed box upwardly.

A furrow forming knife 24 may be secured to the beam 3 when it is desired to use the device as a seed planter and this furrow forming knife comprises an elongated thin blade 24 having a substantially U-shaped upper end or head 25. This substantially U-shaped head 25 is adapted to fit over the beam 3 and a suitable bolt 26 passes therethrough for the purpose of firmly securing the knife 24 to the beam 3.

It should be understood that the furrow forming knife 24 is adapted to dig the furrow or form a channel into which the grain is adapted to be deposited through a discharge chute 16. After the grain has been deposited through the chute 16, the cultivator blades 23 will follow in the rear thereof and cover the grain which has been deposited in the furrow. The frame 2 of the planter is provided with a plurality of projecting fingers 27 which projecting fingers 27 are engaged by means of springs 28 and these springs 28 are in turn secured to the cultivator blade supporting arms 21 for normally pulling the same to an inoperative position.

The operator must therefore necessarily force downwardly upon the handles 20 in order to hold the blades 23 into engagement with the ground.

It of course should be understood that the chain or cable may be substituted for the rod 17 for pulling the seed box 6 downwardly and throwing the gear 7 into engagement with the pinion 8. The spring 17ª will of course pull the seed box 6 upwardly and draw the gear out of engagement with the pinion 8 due to the fact that the seed box 6 is journaled upon the supporting bar or shaft 14.

What is claimed is:

1. A planter of the class described comprising a frame, a beam supported thereby, a pair of axles, braces secured to said beam and also secured to said axles, a seed-box, a transversely extending rod secured to said braces, said seed-box being pivotally mounted upon said transversely extending rod, operating means for said seed-box, and means for throwing said seed-box into and out of engagement with said operating means.

2. A planter of the class described comprising a pair of axles, supporting wheels upon said axles, a frame carried by said axles, a draft beam carried by said frame, braces secured to said draft beam and to said axles, a transversely extending supporting bar connected to said brace means, a seed box pivotally supported upon said transversely extending supporting bar, a driving shaft, journals carried by said bracing bars and supporting said driving shaft, a pinion carried by said driving shaft and adapted to actuate said seed box, means for throwing said seed box out of engagement with said pinion, and means for driving said shaft.

3. A planter of the class described comprising a frame, cultivator blade supporting arms carried by said frame, handles carried by said cultivating blade supporting bars, a seed box pivotally mounted within said frame, a supporting means for said seed box, a rod connected to said seed box, and means carried by said handle for guiding said rod and adapted to permit a longitudinal movement of said rod for raising and lowering said seed box.

4. A planter of the class described comprising a frame, a seed box, pivoted upon said frame, a lifting spring secured to said frame and engaging the forward end of said seed box for normally pulling the same upwardly, a driving gear carried by the lower end of said seed box, a driving pinion adapted to mesh with said driving gear, and means connected to said seed box for permitting said seed box to be thrown into engagement with said driving pinion at selective intervals.

In testimony whereof I hereunto affix my signature.

ELEMUEL I. OLINGER.

Copies of this patent may be obtained for five cents each, by addressing the "Commissioner of Patents, Washington, D. C."